(12) United States Patent
Hsu et al.

(10) Patent No.: US 8,836,923 B2
(45) Date of Patent: Sep. 16, 2014

(54) DISTANCE MEASUREMENT SYSTEM

(71) Applicant: PixArt Imaging Inc., Hsin-Chu (TW)

(72) Inventors: En-Feng Hsu, Hsin-Chu (TW);
Chi-Chieh Liao, Hsin-Chu (TW);
Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/959,758

(22) Filed: Aug. 6, 2013

(65) Prior Publication Data

US 2013/0314691 A1   Nov. 28, 2013

Related U.S. Application Data

(63) Continuation of application No. 12/896,927, filed on Oct. 4, 2010, now Pat. No. 8,537,339.

(30) Foreign Application Priority Data

Jun. 15, 2010 (TW) ................................ 99119480 A

(51) Int. Cl.
*G01C 3/08* (2006.01)
*G01C 3/10* (2006.01)
*G01S 7/491* (2006.01)
*G01S 17/48* (2006.01)

(52) U.S. Cl.
CPC .. *G01C 3/08* (2013.01); *G01C 3/10* (2013.01); *G01S 7/4918* (2013.01); *G01S 17/48* (2013.01)
USPC ......... 356/4.03; 356/4.01; 356/4.1; 356/5.01; 356/5.1

(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,522,492 A | 6/1985 | Masunaga | |
| 4,974,005 A | 11/1990 | Izumi | |
| 5,519,204 A * | 5/1996 | Rudd et al. ..................... | 250/205 |
| 5,534,991 A | 7/1996 | Maeda | |
| 5,811,774 A * | 9/1998 | Ju et al. ......................... | 235/455 |
| 6,370,331 B1 | 4/2002 | Okubo | |
| 6,549,058 B1 | 4/2003 | Bondarev | |
| 7,406,181 B2 * | 7/2008 | O'Boyle et al. .............. | 382/104 |
| 7,436,495 B2 * | 10/2008 | Tachino et al. .............. | 356/4.07 |
| 7,457,476 B2 * | 11/2008 | Olsson .......................... | 382/274 |
| 7,720,554 B2 * | 5/2010 | DiBernardo et al. .......... | 700/56 |
| 2005/0162638 A1 * | 7/2005 | Suzuki et al. ................ | 356/4.04 |
| 2005/0213082 A1 * | 9/2005 | DiBernardo et al. .... | 356/139.03 |
| 2008/0094643 A1 | 4/2008 | Nishio | |
| 2008/0100820 A1 * | 5/2008 | Sesko .......................... | 356/4.01 |

\* cited by examiner

*Primary Examiner* — Isam Alsomiri
*Assistant Examiner* — Assres H Woldemaryam
(74) *Attorney, Agent, or Firm* — Winston Hsu; Scott Margo

(57) ABSTRACT

A light source transmits detecting light toward an object. The object reflects the detecting light and forms a reflected light. A sensor is used for sensing the reflected light. Then, an exposure control unit coupled to the sensor performs luminance convergence on the reflected light according to luminance of the reflected light sensed by the sensor. And a distance measurement device coupled to the sensor detects a distance between the object and the light source and/or the sensor according to an image position of the reflected light on the sensor.

18 Claims, 6 Drawing Sheets

DISTANCE MEASUREMENT SYSTEM

CROSS REFERENCE TO RELATED APPLICATIONS

This is a continuation application of U.S. patent application Ser. No. 12/896,927, filed on Oct. 4, 2010, and all benefits of such earlier application are hereby claimed for this new continuation application.

BACKGROUND OF THE INVENTION

1. Field of the Invention

The present invention relates to a distance measurement system and method thereof, and more particularly, to a distance measurement system and method thereof capable of utilizing an automatic exposure-control mechanism to increase dynamic range of an exposure time, and a signal to noise ratio.

2. Description of the Prior Art

In the prior art, a distance measurement device transmits detecting light toward an object, and receives reflected light generated by the object reflecting the detecting light, and then calculating a distance between the object and the distance measurement device according to an image position of the reflected light on a sensor. However, when the distance measurement device sensed the reflected light reflected by the object, an exposure control unit of the distance measurement device can not automatically adjust an exposure time of the sensor, a sensing mode of the sensor, an output signal gain of the sensor, and/or supply current of a light source with luminance of the reflected light, so that the distance measurement device can not increase dynamic range of the exposure time of the sensor, and a signal to noise ratio. In addition, the distance measurement device cannot automatically adjust the exposure time of the sensor, the sensing mode of the sensor, the output signal gain of the sensor, and/or the supply current of the light source, so as to cause the exposure time of the sensor to be over-saturated or insufficient resulting in the distance measurement device gaining incorrect measurement distance and lower power efficiency.

SUMMARY OF THE INVENTION

An embodiment provides a distance measurement system. The distance measurement system includes a light source, a sensor, an exposure control unit, and a distance measurement device. The light source is used for transmitting detecting light toward an object, where the detecting light is reflected by a surface of the object to form reflected light. The sensor is used for sensing the reflected light. The exposure control unit is used for performing luminance convergence on the reflected light according to luminance of the reflected light sensed by the sensor. And the distance measurement device is used for detecting a distance between the object and the light source and/or the sensor according to an image position of the reflected light on the sensor.

Another embodiment provides a method of distance measurement. The method includes utilizing a light source to transmit detecting light toward an object, wherein the detecting light is reflected by a surface of the object to form reflected light; utilizing a sensor to sense the reflected light; performing luminance convergence on the reflected light according to luminance of the reflected light sensed by the sensor; and detecting a distance between the object and the light source and/or the sensor according to an image position of the reflected light on the sensor.

The present invention provides a distance measurement system. The distance measurement system is capable of automatically adjusting an exposure time of a sensor, a sensing mode of the sensor, an output signal gain of the sensor, and/or supply current of a light source for different application conditions for controlling luminance of reflected light sensed by the sensor not to be over-saturated or insufficient. Therefore, the distance measurement system can increase accuracy of the distance measurement, dynamic range of the exposure time of the sensor, and a signal to noise ratio.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
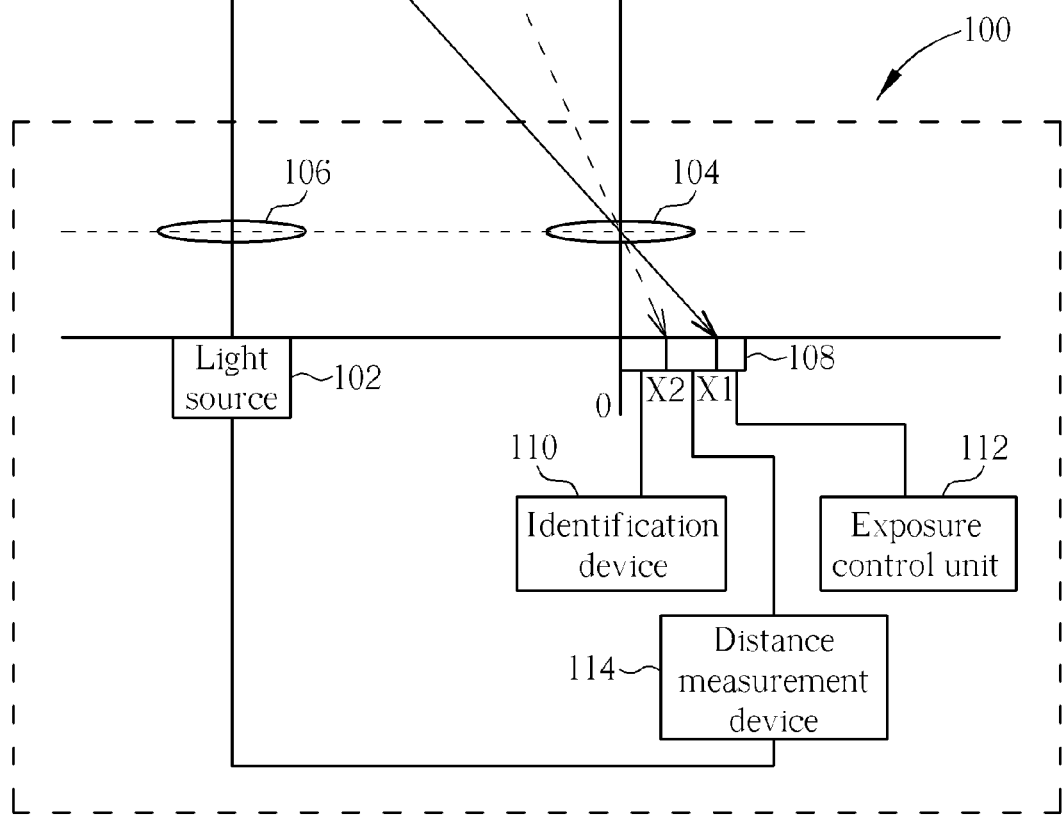
FIG. 1 is a diagram illustrating a distance measurement system according to an embodiment of the present invention.

Please refer to FIG. 1. FIG. 1 is a diagram illustrating a distance measurement system 100 according to an embodiment of the present invention. The distance measurement system 100 includes a light source 102, a first lens 104, a second lens 106, a sensor 108, an identification device 110, an exposure control unit 112, and a distance measurement device 114. The light source 102 is used for transmitting detecting light toward an object, where the light source 102 is an IR LED light source. The second lens 106 is installed between the light source 102 and the object for focusing the detecting light on the surface of the object, and the focused detecting light is reflected by the surface of the object to form reflected light. The first lens 104 is installed between the sensor 108 and the object for focusing the reflected light on the sensor 108. The sensor 108 is used for sensing the focused reflected light, where the sensor 108 senses a first image when the light source 102 is turned on, and senses a second image when the light source 102 is turned off. The identification device 110 is coupled to the sensor 108 for comparing the first image with the second image to identify an image position of the reflected light reflected by the object on the sensor 108. The exposure control unit 112 is coupled to the sensor 108 for performing luminance convergence on the reflected light according to luminance of the reflected light sensed by the sensor 108 and the image position of the reflected light, so as to cause the luminance of the reflected light sensed by the sensor 108 not to be over-saturated or insufficient. The distance measurement device 114 is coupled to the sensor 108 for detecting a distance between the object and the light source 102 and/or the sensor 108 by the triangulation measurement method according to the image position of the reflected light on the sensor 108.

Figure 2:
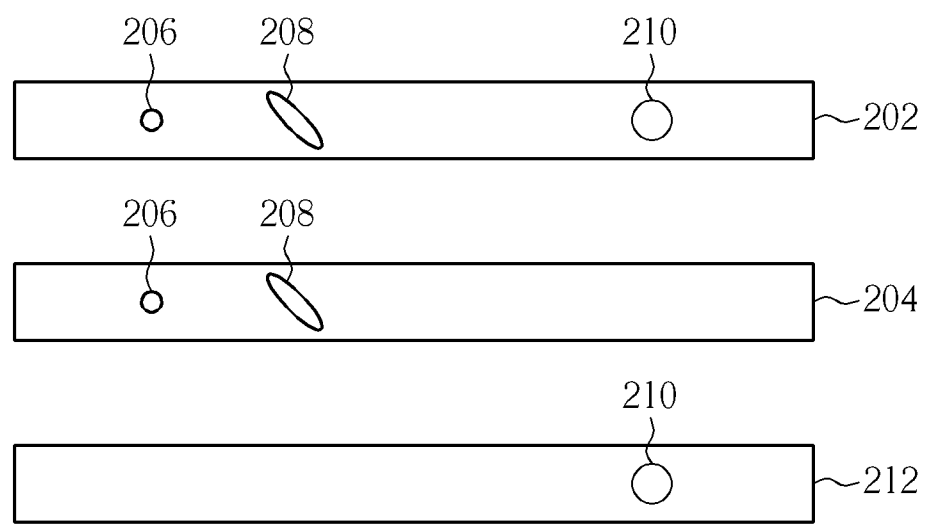
FIG. 2 is a diagram illustrating the sensor sensing a first image and a second image respectively when the light source is turned on or off and the identification device comparing the first image with the second image to determine the reflected light which is reflected to the sensor by the surface of the object.

Please refer to FIG. 2. FIG. 2 is a diagram illustrating the sensor 108 sensing a first image 202 and a second image 204 respectively when the light source 102 is turned on or off and the identification device 110 comparing the first image 202 with the second image 204 to determine the reflected light which is reflected to the sensor 108 by the surface of the object. As shown in FIG. 2, the first image 202 includes bright spots 206, 208 caused by background light sources and a bright spot 210 caused by the object. The second image 204 only includes the bright spots 206, 208 because the light source 102 is turned off. Therefore, the identification device 110 excludes the bright spots 206, 208 after comparing the first image 202 with the second image 204 to obtain a third image 212 only including the bright spot 210 caused by the object.

Figure 3:
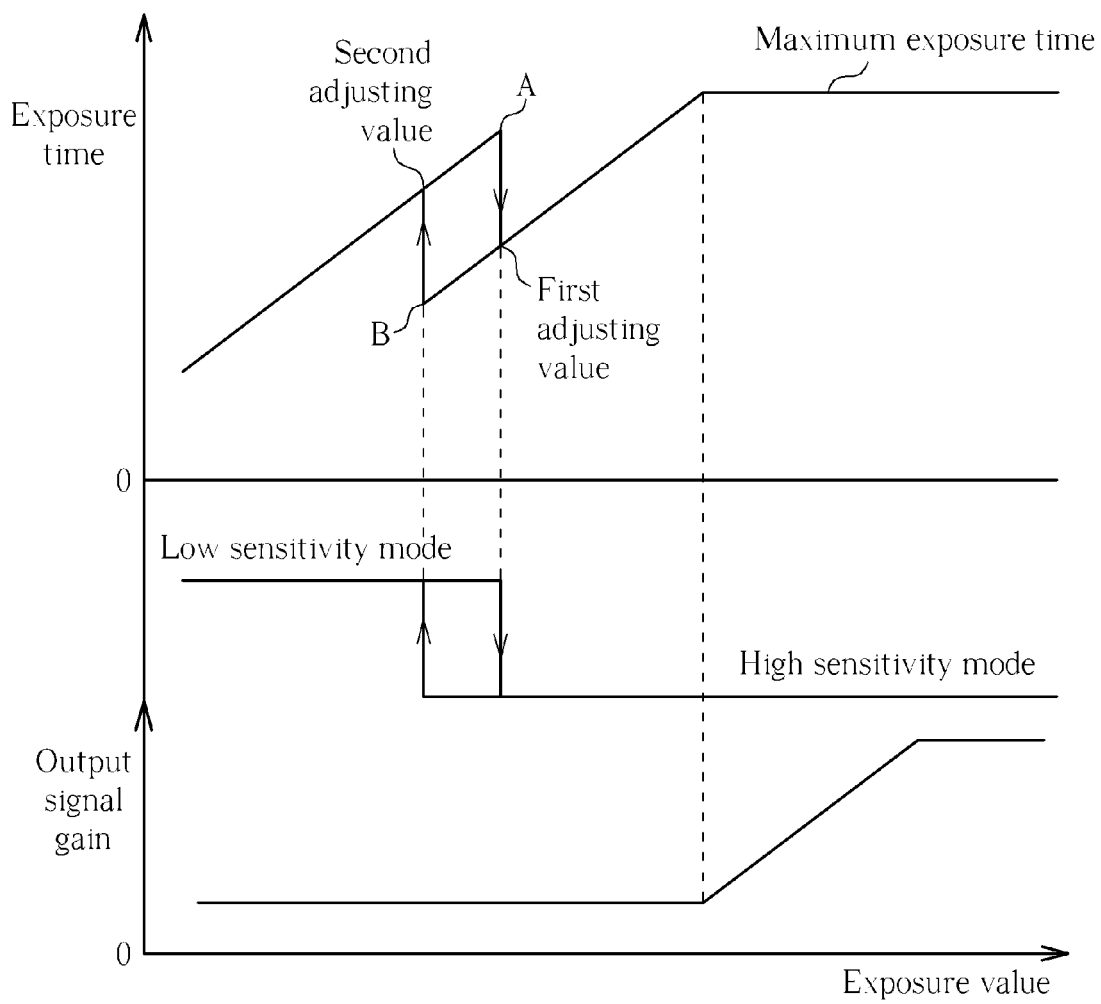
FIG. 3 is a diagram illustrating the exposure control unit performing luminance convergence on the reflected light according to luminance of the reflected light sensed by the sensor.
Figure 4:
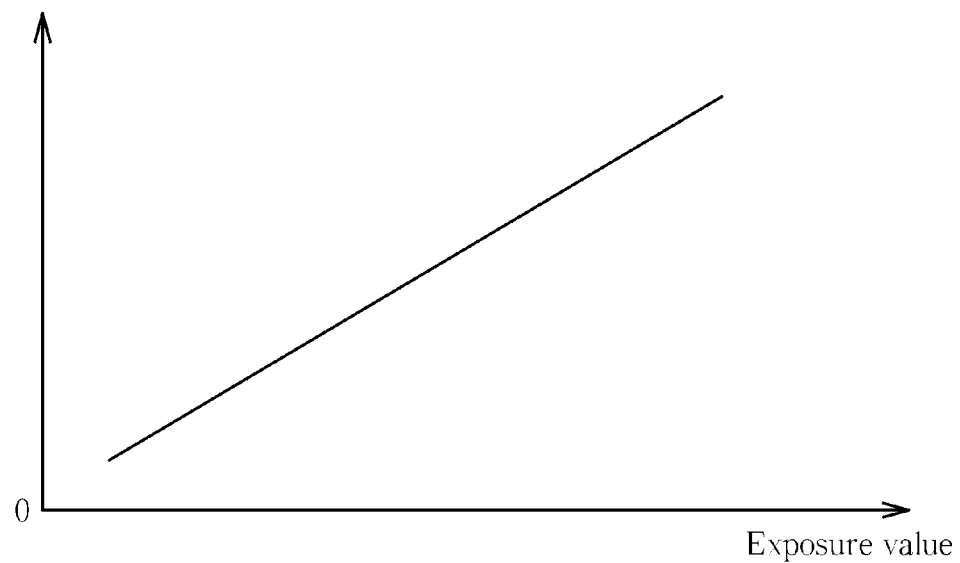
FIG. 4 is a diagram illustrating a relationship between the luminance of the reflected light sensed by the sensor and an exposure value after the exposure control unit performs the luminance convergence on the reflected light.

Please refer to FIG. 3 and FIG. 4. FIG. 3 is a diagram illustrating the exposure control unit 112 performing the luminance convergence on the reflected light according to the luminance of the reflected light sensed by the sensor 108. FIG. 4 is a diagram illustrating a relationship between the luminance of the reflected light sensed by the sensor 108 and an exposure value after the exposure control unit 112 performs the luminance convergence on the reflected light. When a distance between the object and the distance measurement system 100 is too long so that the luminance of the reflected light sensed by the sensor is too low, the exposure control unit 112 first increases exposure time of the sensor 108. If an exposure value is still insufficient after the exposure time of the sensor 108 is extended to a first predetermined time (A point in FIG. 3), a sensing mode of the sensor 108 is switched to a high sensitivity mode and the exposure time of the sensor 108 is adjusted down from the first predetermined time to a first adjusting value. If the exposure value is still insufficient, the exposure time of the sensor 108 is increased from the first adjusting value. When the exposure time of the sensor 108 is equal to the maximum exposure time of the sensor 108, the exposure control unit 112 starts to increase an output signal gain of the sensor 108. So as shown in FIG. 4, a relationship between the luminance of the reflected light sensed by the sensor 108 and the exposure value is linear after the exposure control unit 112 adjusts the luminance of the reflected light. In addition, the exposure control unit 112 can also adjust supply current of the light source 102 for increasing the luminance of the detecting light transmitted by the light source 102, and the luminance of the reflected light. But the present invention is not limited to start to increase the output signal gain of the sensor 108 when the exposure time of the sensor 108 is equal to the maximum exposure time of the sensor 108. The output signal gain of the sensor 108 starts to be increased when the exposure time is not equal to the maximum exposure time of the sensor 108 yet in another embodiment of the present invention.

In addition, when the distance between the object and the distance measurement system 100 is too short so that the luminance of the reflected light sensed by the sensor is too high, the exposure control unit 112 first decreases the output signal gain of the sensor 108 for reducing the luminance of the reflected light. If the luminance of the reflected light sensed by the sensor 108 is still too high, the exposure control unit 112 further decreases the exposure time of the sensor 108. If the exposure value of the sensor 108 is still too high after the exposure time of the sensor 108 is reduced to a second predetermined time (B point in FIG. 3), the sensing mode of the sensor 108 is switched to a low sensitivity mode and the exposure time of the sensor 108 is adjusted up from the second predetermined time to a second adjusting value. If the exposure value is still too high, the exposure time of the sensor 108 is decreased from the second adjusting value. So as shown in FIG. 4, the relationship between the luminance of the reflected light sensed by the sensor 108 and the exposure value is linear after the exposure control unit 112 adjusts the luminance of the reflected light. In addition, the exposure control unit 112 can also adjust supply current of the light source 102 for decreasing the luminance of the detecting light transmitted by the light source 102, and the luminance of the reflected light. But the present invention is not limited to first decrease the output signal gain of the sensor 108, and then adjust the exposure time of the sensor 108. In another embodiment of the present invention, the exposure control unit 112 can also first adjust the exposure time of the sensor 108 and then decrease the output signal gain of the sensor 108, or adjust the exposure time of the sensor 108 and decrease the output signal gain of the sensor 108 at the same time.

Besides, the exposure control unit 112 may control the luminance of the reflected light sensed by the sensor 108 by automatically adjusting the exposure time of the sensor 108, the sensing mode of the sensor 108, the output signal gain of the sensor 108, and/or the supply current of the light source 102 for different application conditions. For example, the exposure control unit 112 may adjust the luminance of the reflected light sensed by the sensor 108 to gray level 200 in some specific application conditions. In addition, the exposure control unit 112 may also increase dynamic range of the exposure time of the sensor 108 by adjusting the sensing mode of the sensor 108 (high, low sensitivity mode).

The distance measurement device 114 is coupled to the sensor 108 for detecting the distance between the object and the light source 102 and/or the sensor 108 by the triangulation measurement method according to the image position of the reflected light on the sensor 108 (X1, X2 points in FIG. 1).

Figure 5:
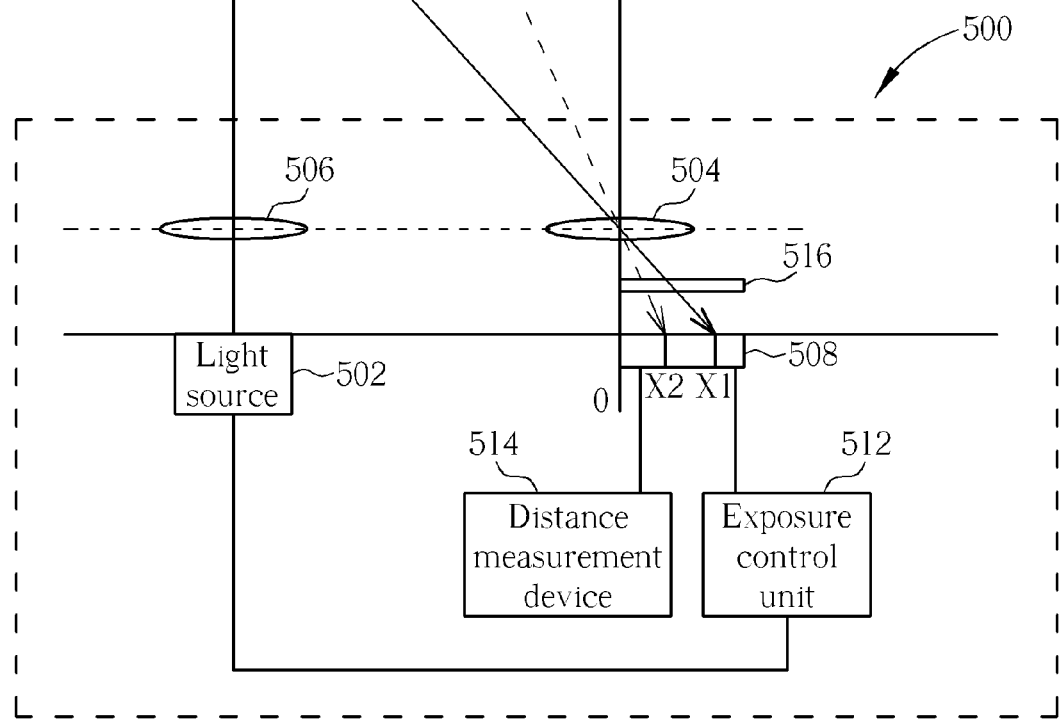
FIG. 5 is a diagram illustrating a distance measurement system according to another embodiment of the present invention.

Please refer to FIG. 5. FIG. 5 is a diagram illustrating a distance measurement system 500 according to another embodiment of the present invention. The distance measurement system 500 includes a light source 502, a first lens 504, a second lens 506, a sensor 508, an exposure control unit 512, and a distance measurement device 514, where the sensor 508 further includes an IR filter 516. A difference between the distance measurement system 500 and the distance measurement system 100 is that the distance measurement system 500 does not have an identification device. Because the IR filter 516 may filter light outside the IR range from entering the sensor 508, the sensor 508 can identify directly reflected light which is reflected to the sensor 508 by a surface of an object without sensing a first image (turning on the light source 502) and a second image (turning off the light source 502). Further, subsequent operational principles of the distance measurement system 500 are the same as the distance measurement system 100, so further description thereof is omitted for simplicity.

Another embodiment of the present invention combines the above both methods of identifying the reflected light in the distance measurement system 100 and the distance measurement system 500, that is to say, a sensor senses a first image (turning on the light source) and a second image (turning off the light source), and an IR filter identifies the reflected light at the same time. Further, subsequent operational principles are the same as the distance measurement system 100 and the distance measurement system 500, so further description thereof is omitted for simplicity.

Another embodiment of the present invention utilizes a laser source as a light source, so another embodiment of the present invention does not need a first lens and a second lens to focus light (detecting light and reflected light). Further, subsequent operational principles are the same as the distance measurement system 100, so further description thereof is omitted for simplicity.

Figure 6:
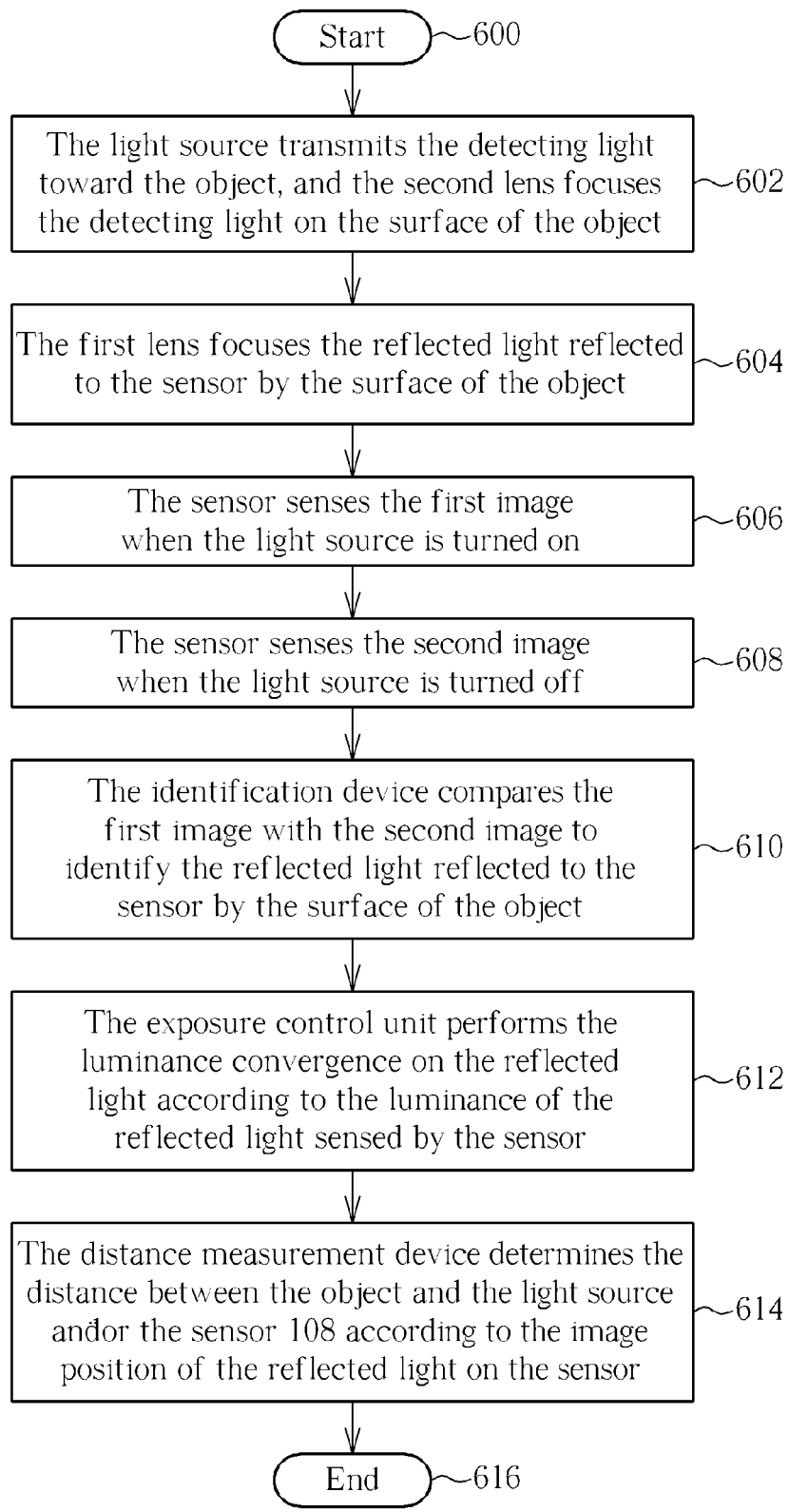
FIG. 6 is a flowchart illustrating a method of distance measurement according to another embodiment of the present invention.

Please refer to FIG. 6. FIG. 6 is a flowchart illustrating a method of distance measurement according to another embodiment of the present invention. FIG. 6 uses the distance measurement system 100 in FIG. 1 to illustrate the method. Detailed steps are as follows:

Step 600: Start.

Step 602: The light source 102 transmits the detecting light toward the object, and the second lens 106 focuses the detecting light on the surface of the object.

Step 604: The first lens 104 focuses the reflected light which is reflected to the sensor 108 by the surface of the object.

Step 606: The sensor 108 senses the first image when the light source 102 is turned on.

Step 608: The sensor 108 senses the second image when the light source 102 is turned off.

Step 610: The identification device 110 compares the first image with the second image to identify the reflected light reflected to the sensor 108 by the surface of the object.

Step 612: The exposure control unit 112 performs the luminance convergence on the reflected light according to the luminance of the reflected light sensed by the sensor 108.

Step 614: The distance measurement device 114 determines the distance between the object and the light source 102 and/or the sensor 108 according to the image position of the reflected light on the sensor 108.

Step 616: End.

In Step 612, the exposure control unit 112 can control the luminance of the reflected light sensed by the sensor 108 not to be over-saturated or insufficient by dynamically adjusting the exposure time of the sensor 108, the sensing mode of the sensor 108, the output signal gain of the sensor 108, and/or the supply current of the light source 102 for increasing the accuracy of the distance measurement device 114. Where detailed step of the exposure control unit 112 performing the luminance convergence on the reflected light as follows: when the luminance of the reflected light sensed by the sensor 108 is too low, the exposure control unit 112 increases the exposure time of the sensor 108 until the first predetermined time (A point in FIG. 3). Meanwhile, the exposure control unit 112 switches the sensing mode of the sensor 108 to the high sensitivity mode and adjusts the exposure time of the sensor 108 down from the first predetermined time to the first adjusting value, and then increases the exposure time of the sensor 108 from the first adjusting value. When the exposure time of the sensor 108 is equal to the maximum exposure time of the sensor 108, the exposure control unit 112 starts to increase the output signal gain of the sensor 108. In addition, the exposure control unit 112 also increases the supply current of the light source 102 for increasing the luminance of the detecting light and the reflected light. In addition, when the luminance of the reflected light sensed by the sensor is too high, the exposure control unit 112 decreases the exposure time of the sensor 108 until the second predetermined time (B point in FIG. 3). Meanwhile, the exposure control unit 112 switches the sensing mode of the sensor 108 to the low sensitivity mode and adjusts the exposure time of the sensor 108 up from the second predetermined time to the second adjusting value, and then decreases the exposure time of the sensor 108 from the second adjusting value. Moreover, the exposure control unit 112 also decreases the supply current of the light source 102 for decreasing the luminance of the detecting light and the reflected light.

Another embodiment of the present invention utilizes an IR source and an IR filter to identify reflected light, or utilizes a sensor to sense a first image (turning on a light source) and a second image (turning off the light source) and the IR filter to identify the reflected light at the same time.

In addition, the embodiment of FIG. 6 also can utilize a laser source as a light source, so that the embodiment of FIG. 6 does not need a first lens and a second lens to focus light.

To sum up, the exposure control unit of the distance measurement system can automatically adjust the exposure time of the sensor, the sensing mode of the sensor, the output signal gain of the sensor, and/or the supply current of the light source for different application conditions for controlling the luminance of the reflected light sensed by the sensor not to be over-saturated or insufficient. Thus, the distance measurement system of the present invention can increase the accuracy of the distance measurement, the dynamic range of the exposure time of the sensor, and the signal to noise ratio.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A distance measurement system, comprising:
    a light source for transmitting detecting light toward an object, wherein the detecting light is reflected by a surface of the object to form reflected light;
    a sensor for sensing the reflected light;
    an exposure control unit configured to increase exposure time of the sensor until a predetermined time when luminance of the reflected light sensed by the sensor is too low, and increase supply current of the light source before increasing the exposure time of the sensor for increasing luminance of the detecting light according to luminance of the reflected light sensed by the sensor after the predetermined time; and
    a distance measurement device for detecting a distance between the object and the light source and/or the sensor according to an image position of the reflected light on the sensor.

2. The distance measurement system of claim 1, further comprising:
    a first lens installed between the sensor and the object for focusing the reflected light on the sensor; and
    a second lens installed between the light source and the object for focusing the detecting light on the surface of the object.

3. The distance measurement system of claim 1, further comprising:
    an identification device for identifying the reflected light focused on the sensor by the first lens, wherein the sensor senses a first image when the light source is turned on, the sensor senses a second image when the light source is turned off, then the identification device compares the first image with the second image to capture the reflected light reflected to the sensor by the surface of the object.

4. The distance measurement system of claim 1, wherein the light source is an infrared (IR) light source and the sensor further comprises an IR filter for blocking light outside the IR range from entering the sensor.

5. The distance measurement system of claim 1, wherein the exposure control unit adjusts the exposure time of the sensor according to the luminance of the reflected light sensed by the sensor for increasing or decreasing a time period of the reflected light entering the sensor.

6. The distance measurement system of claim 1, wherein the exposure control unit adjusts the sensor to operate in a high sensitivity mode or a low sensitivity mode according to the luminance of the reflected light sensed by the sensor for adjusting efficiency of the sensor receiving the reflected light.

7. The distance measurement system of claim 1, wherein the exposure control unit adjusts an output signal gain of the sensor after the sensor senses the reflected light according to the luminance of the reflected light sensed by the sensor for amplifying or decaying a value outputted by the sensor representing the luminance of the reflected light.

8. The distance measurement system of claim 1, wherein the exposure control unit further adjusts the supply current of the light source for increasing or decreasing the luminance of the detecting light transmitted by the light source for further changing the luminance of the reflected light entering the sensor.

9. The distance measurement system of claim 1, wherein the light source is a light emitting diode or a laser source.

10. A distance measurement system, comprising:
    a light source for transmitting detecting light toward an object, wherein the detecting light is reflected by a surface of the object to form reflected light;
    a sensor for sensing the reflected light;
    an exposure control unit configured to decrease exposure time of the sensor until a predetermined time when luminance of the reflected light sensed by the sensor is too high, and decrease supply current of the light source before decreasing the exposure time of the sensor for reducing luminance of the detecting light according to luminance of the reflected light sensed by the sensor after the predetermined time; and
    a distance measurement device for detecting a distance between the object and the light source and/or the sensor according to an image position of the reflected light on the sensor.

11. The distance measurement system of claim 1, further comprising:
    a first lens installed between the sensor and the object for focusing the reflected light on the sensor; and
    a second lens installed between the light source and the object for focusing the detecting light on the surface of the object.

12. The distance measurement system of claim 1, further comprising:
    an identification device for identifying the reflected light focused on the sensor by the first lens, wherein the sensor senses a first image when the light source is turned on, the sensor senses a second image when the light source is turned off, then the identification device compares the first image with the second image to capture the reflected light reflected to the sensor by the surface of the object.

13. The distance measurement system of claim 1, wherein the light source is an infrared (IR) light source and the sensor further comprises an IR filter for blocking light outside the IR range from entering the sensor.

14. The distance measurement system of claim 1, wherein the exposure control unit adjusts the exposure time of the sensor according to the luminance of the reflected light sensed by the sensor for increasing or decreasing a time period of the reflected light entering the sensor.

15. The distance measurement system of claim 1, wherein the exposure control unit adjusts the sensor to operate in a high sensitivity mode or a low sensitivity mode according to the luminance of the reflected light sensed by the sensor for adjusting efficiency of the sensor receiving the reflected light.

16. The distance measurement system of claim 1, wherein the exposure control unit adjusts an output signal gain of the sensor after the sensor senses the reflected light according to the luminance of the reflected light sensed by the sensor for amplifying or decaying a value outputted by the sensor representing the luminance of the reflected light.

17. The distance measurement system of claim 1, wherein the exposure control unit further adjusts the supply current of the light source for increasing or decreasing the luminance of the detecting light transmitted by the light source for further changing the luminance of the reflected light entering the sensor.

18. The distance measurement system of claim 1, wherein the light source is a light emitting diode or a laser source.

* * * * *